United States Patent [19]
Uchida et al.

[11] Patent Number: 5,755,613
[45] Date of Patent: May 26, 1998

[54] TWO GRINDER OPPOSED GRINDING APPARATUS AND A METHOD OF GRINDING WITH THE APPARATUS

[75] Inventors: Haruto Uchida, Kadoma; Noriyuki Inagaki, Osaka; Issey Yasuda, Kadoma; Masayuki Takahashi, Hirakata, all of Japan

[73] Assignee: Matsushita Electric Industrial Co., Ltd., Osaka, Japan

[21] Appl. No.: 522,097

[22] Filed: Aug. 31, 1995

[30] Foreign Application Priority Data

Aug. 31, 1994 [JP] Japan .................. 6-206151
Aug. 31, 1994 [JP] Japan .................. 6-206152

[51] Int. Cl.[6] .................................. B24B 7/04
[52] U.S. Cl. .................. 451/41; 451/63; 451/269; 451/285; 451/333
[58] Field of Search .................. 451/63, 41, 10, 451/11, 262, 268, 269, 285, 334, 335, 333, 332

[56] References Cited

U.S. PATENT DOCUMENTS

| | | | |
|---|---|---|---|
| 3,846,940 | 11/1974 | Dunn | 451/269 |
| 4,002,246 | 1/1977 | Brandt et al. | 451/334 |
| 4,217,734 | 8/1980 | Freo | 451/269 |
| 4,368,912 | 1/1983 | Shigeru | 451/269 |
| 4,406,091 | 9/1983 | Eckardt et al. | 451/334 |
| 4,517,772 | 5/1985 | Elliott | 451/63 |
| 4,545,153 | 10/1985 | Miller et al. | 451/269 |
| 4,856,232 | 8/1989 | Shirai | 451/334 |
| 5,121,572 | 6/1992 | Hilscher | 451/269 |
| 5,329,723 | 7/1994 | Karlsrud et al. | 451/334 |
| 5,333,413 | 8/1994 | Hashimoto | 451/269 |

FOREIGN PATENT DOCUMENTS

| | | | |
|---|---|---|---|
| 361164773 | 7/1986 | Japan | 451/63 |
| 361168462 | 7/1986 | Japan | 451/63 |
| 1569189 | 6/1990 | U.S.S.R. | 451/63 |

OTHER PUBLICATIONS

Gardner Grinder, pp. 2-6, Jan. 1951.

*Primary Examiner*—Eileen Morgan
*Attorney, Agent, or Firm*—Wenderoth, Lind & Ponack

[57] ABSTRACT

A grinding apparatus includes a disc-like carrier rotatably driven and having a plurality of holding holes formed in a circumferential direction thereof, the carrier transferring a work fitted in each of the holes, a ring-shaped holder member disposed at an outer peripheral part of the carrier and holding the carrier in a stretched state, an upper and a lower guide members for guiding upper and lower surfaces of the work fitted in the holding hole of the carrier and transferred by rotation of the carrier, and a first grindstone arranged at either an upper or a lower side of a processing position for grinding one of the upper and lower surfaces of the work while the other surface of the work is guided by means of either one of the guide members.

24 Claims, 7 Drawing Sheets

TWO GRINDER OPPOSED GRINDING APPARATUS AND A METHOD OF GRINDING WITH THE APPARATUS

BACKGROUND OF THE INVENTION

The present invention relates to an apparatus and a method for grinding one or both surfaces of a sheet-like or cylindrical material for parts made of ceramics represented by piezoelectric elements, crystal or silicon parts, or automobile gear parts, etc.

Ceramics parts of 0.5 or smaller thickness, such as piezoelectric elements or the like, are formed into flakes by a slicing machine. Both surfaces of the thus-formed ceramics parts are processed afterwards so as to have necessary electric characteristics. A duplex head slicing apparatus as shown in FIGS. 9A and 9B has been used heretofore during processing.

Figure 9A:
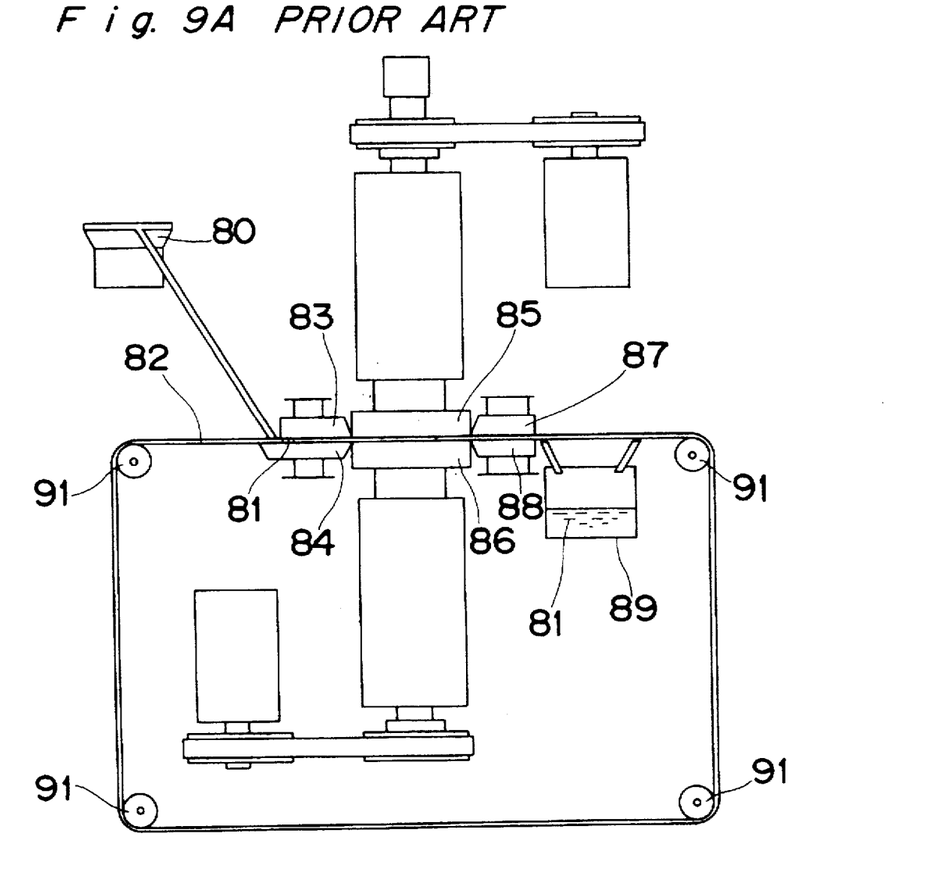
FIGS. 9A and 9B are sectional views showing the structure of a conventional duplex head grinding apparatus.
Figure 9B:
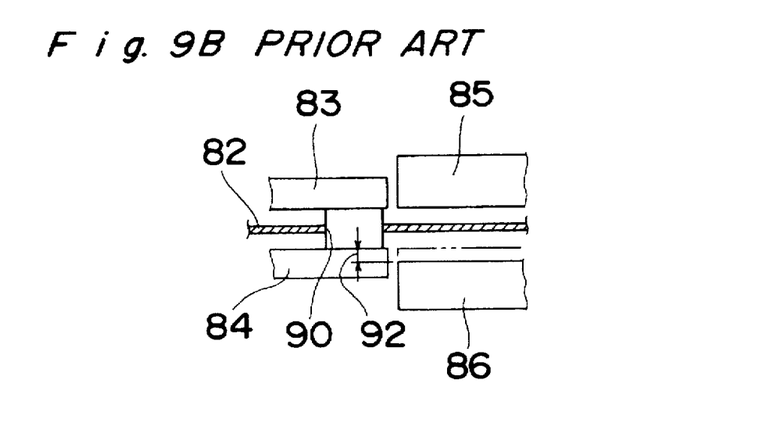

The duplex head slicing apparatus is constituted as shown in FIG. 9A. More specifically, in the duplex head slicing apparatus, a work 81 supplied from a parts feeder 80 is set in a holding hole 90 of a through feeder 82 of FIG. 9B, stretched like an endless belt by guide rollers 91, and introduced in between a pair of upper and lower grindstones 85 and 86 that are facing each other. During this time, upper and lower guides 83 and 84 guide the work 81. The work 81 is, after being processed at both surfaces thereof by the upper and lower grindstones 85 and 86, transferred a predetermined distance further under the guidance of another pair of upper and lower guides 87 and 88. The work 81 is allowed to naturally fall when separated from the upper and lower guides 87 and 88 and is collected in a container 89.

In this manner, both surfaces of various kinds of material in the shape of a film or a column are simultaneously ground. If the work 81 is as thin as approximately 0.1–0.2 mm, a metallic belt or the like is employed for the through feeder 82, which is set to be thinner than the work 81 so as to grind both surfaces of the work 81.

The through feeder 82 extended by the guide rollers 91 as mentioned hereinabove is easy to vibrate, or is slack as a result of the accumulation of minute extensions and shrinkage at every part, and eventually, in the case of being in touch with the upper and lower grindstones 85 and 86, the through feeder 82 as well as the grindstones is abraded and has its life shortened. The through feeder 82 is hard to have transfer the work 81 in a stable state, a sufficient processing accuracy cannot be achieved. What is worse is that the unstable transfer causes the work 81 to slip out from the holding hole 90 of the through feeder 82 to be caught between the through feeder 82 and grindstone 85 or 86. The work 81 thus cannot be processed properly. In some cases, the work 81 may be forced through between the upper and lower grindstones 85 and 86, being damaged by or damaging the grindstones 85 and 86. Particularly if the lower grindstone 86, etc. is abraded from the state of the hidden line to the state of the solid line shown in FIG. 9B, a step difference 92 is generated between the lower guide 84 and lower grindstone 86, enlarging the gap between the through feeder 82 and the lower grindstone 86. As a consequence of this, the work 81 easily comes off the holding hole 90 and drops into the gap between the through feeder 82 and lower grindstone 86 when being delivered from the lower guide 84 to the lower grindstone 86. Such inconveniences occur frequently in the prior art.

SUMMARY OF THE INVENTION

The object of the present invention is therefore to provide an apparatus and a method for grinding one or both surfaces of even a work like a thin film stably.

In accomplishing these and other objects, according to one aspect of the present invention, there is provided a grinding apparatus comprising a disk-like carrier that is rotatably driven and has a plurality of holding holes formed in a circumferential direction thereof. The carrier transfers a work fitted in each of the holes. A ring-shaped holder member is disposed at an outer peripheral part of the carrier and holds the carrier in tension. Upper and lower guide members guide upper and lower surfaces of the work fitted in the holding hole of the carrier and transferred by rotation of the carrier. A first grindstone is arranged at either upper or a lower side of a processing position for grinding one of the upper and lower surfaces of the work, while the other surface of the work is guided by means of either one of the guide members.

According to another aspect of the present invention, there is provided a grinding method comprising fitting works one by one in a plurality of holding holes formed in a circumferential direction of a disc-like carrier held in tension by a ring-shaped holder member arranged at an outer peripheral part of the carrier, guiding upper and lower surfaces of each work fitted in the holding hole of the carrier with upper and lower guide members when the work is transferred by rotation of the carrier, and grinding one of the upper and lower surfaces of the work with a first grindstone arranged at a corresponding one of an upper and lower side of a processing position and, at the same time, guiding the other surface of the work with a corresponding one of the guide members.

BRIEF DESCRIPTION OF THE DRAWINGS

The above and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

A grinding apparatus and a grinding method in accordance with preferred embodiments of the present invention will be described in detail.

Figure 1:
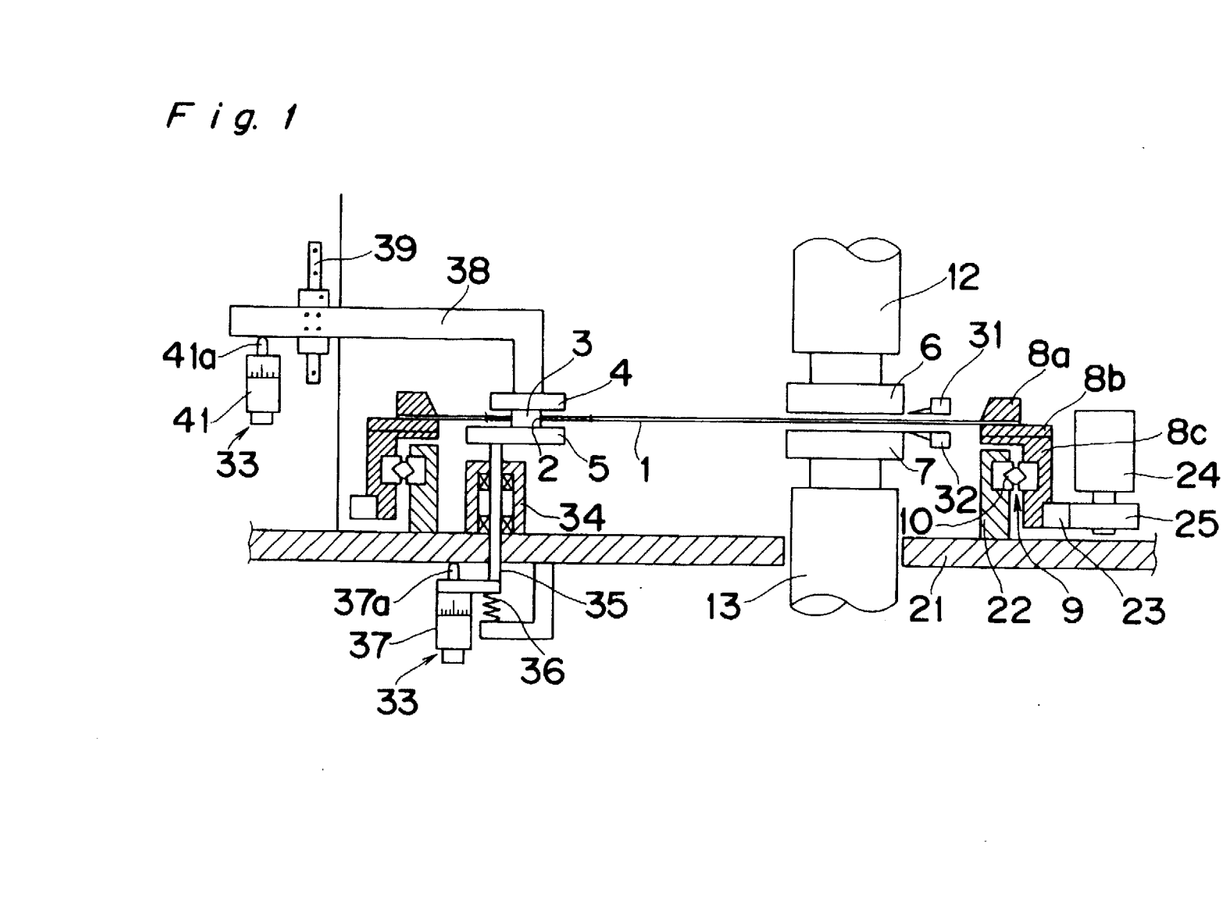
FIG. 1 is a sectional view showing the structure of a duplex head grinding apparatus according to a first embodiment of the present invention.

FIG. 1 is a duplex head grinding apparatus according to a first embodiment of the present invention. As shown in FIG. 1, in the grinding apparatus of the embodiment, a work 3 carried along the upper and lower guides 4 and 5, while seated in one of holding holes 2 of a carrier 1, is introduced between a pair of confronting upper and lower grindstones 6 and 7, where both surfaces of the work 3 are processed.

Figure 5:
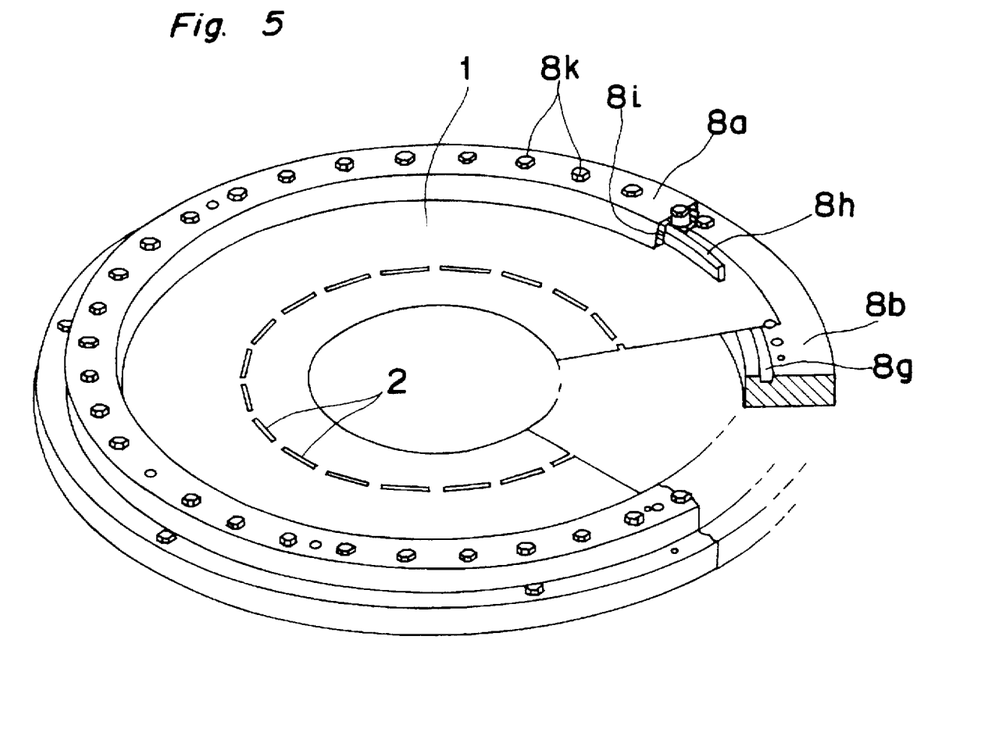
FIG. 5 is a partially-cutout perspective view showing a rotary carrier of FIG. 1.
Figure 6:
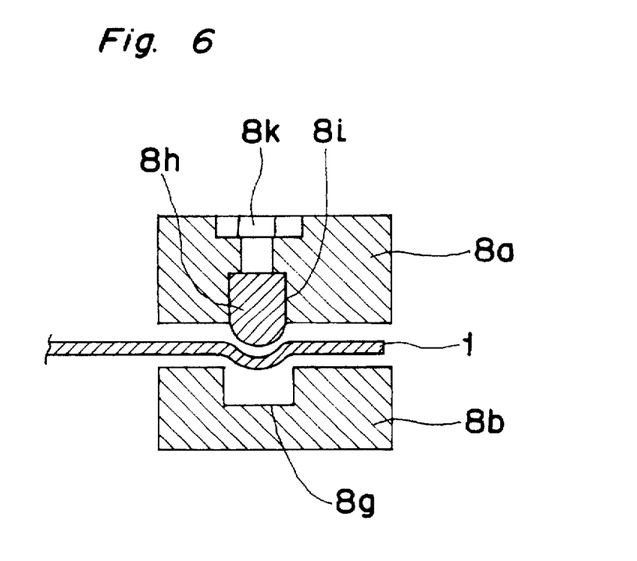
FIG. 6 is a cross sectional view of the carrier of FIG. 5.

The carrier 1 is in the shape of a thin plate held and supported between a pair of annular upper and lower rigid holders 8a and 8b in a state of tension in a centrifugal direction, similarly to a membrane of a drum and as shown in FIGS. 5 and 6. The holders 8a and 8b are formed of metal, for example stainless steel, with the holders 8a and 8b being disposed at the outer periphery of the carrier 1. As a concrete example, a carrier made of stainless steel has a thickness of 1.0 mm and holds a work of 1.5 mm thickness in its holding hole away from the upper and lower surfaces of the carrier 1 by 0.25 mm. As shown in FIGS. 5 and 6, a ring 8h fitted into an annular recess 8i of the upper holder 8a is fitted into an annular recess 8g of the lower holder 8b via the carrier 1 with the holders 8a and 8b fixed to each other by bolts 8k. The bolts 8k press the ring 8h together with the carrier 1 into the recess 8g of the lower holder 8b or release the pressing of the ring 8h so as to adjust the state of tension of the carrier 1 by turning the bolts 8k. A fitting ring 8c is coupled at a lower surface of the lower holder 8b. A rotary supporting mechanism 9 utilizing, e.g., a cross roller bearing 10, is provided between the fitting ring 8c and a supporting ring 22 secured onto a base plate 21. The supporting mechanism 9 supports the carrier 1 in a rotatable fashion via the holders 8a and 8b. Therefore, the carrier 1 is rotated by a motor 24 in such a manner, for instance, that a gear 23 set in the lower outer periphery of the fitting ring 8c is meshed with a driving gear 25 directly coupled to the motor 24. As the carrier 1 is rotated, the works 3 held in the holding holes 2 formed at an outer peripheral part of the carrier 1 are transferred as mentioned above. The upper and lower guides 4 and 5 are generally set in a range of the carrier 1 excluding the locations where grindstones 6 and 7 are located, where the work 3 is delivered to the carrier 1, and where the work 3 is taken therefrom.

The carrier 1 of the thin plate is supported under tension by the rigid holders 8a and 8b while the work 3 fitted in the holding hole 2 is transferred towards the grindstones 6 and 7 and guided by the guides 4 and 5 and supplied to a location between the grindstones 6 and 7 to enable process the work 3 on the upper and lower surfaces thereof. Thus, the carrier 1 is prevented from being vibrated or slack consequent to the accumulation of extensions and shrinkage at each part, and rather demonstrates a high rigidity at the outer peripheral part thereof. The work 3 fitted in the holding hole 2 at the outer peripheral part of the above carrier 1 is accordingly not adversely influenced by vibration or slackness of the carrier 1. Moreover, since the carrier 1 is rotated stably by the surfaces of the rigid holders 8a and 8b, even though the work 3, of a thin film, is transferred utilizing the carrier 1, the work 3 is securely and stably transferred without falling between the upper and lower grindstones 6 and 7 or being caught between the carrier 1 and grindstone 6 or 7, etc. A high processing accuracy is thus stably achieved. Further, since the outer peripheral part of the carrier 1 that is actually a transferring part for the work is highly rigid and stable without generating vibrations or becoming slack, the carrier 1 is prevented from being abraded by contact with the grindstones 6 and 7. In other words, the carrier is improved in its durability, hence ensuring highly accurate processing for a long time.

Meanwhile, the rigid holders for supporting the carrier 1 under tension at the outer periphery thereof, the rotary supporting mechanism for supporting the carrier 1 via the rigid holders, and the rotary driving mechanism for the carrier 1 are not restricted to only the above configuration, but may be designed in various ways.

Figure 7:
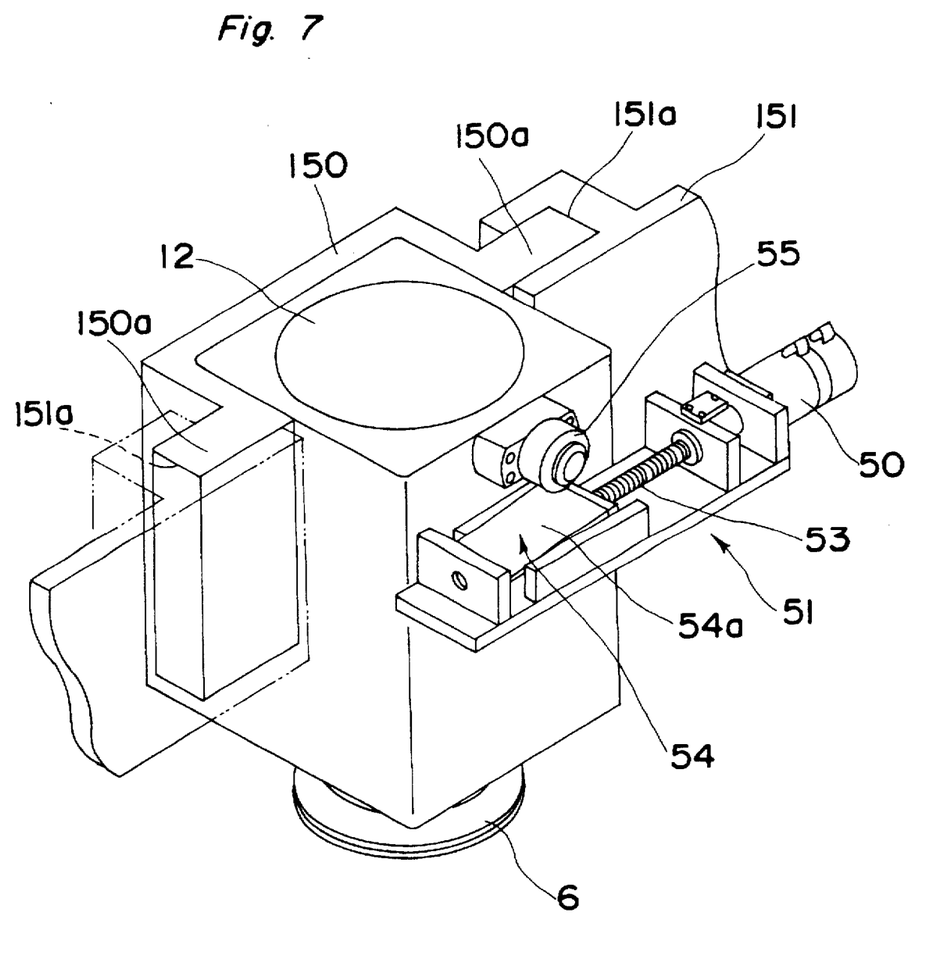
FIG. 7 is a perspective view showing a regulating mechanism for a rotary spindle.

The upper and lower grindstones 6 and 7 are set at leading ends of rotary spindles 12 and 13. A distance between the grindstones 6 and 7 is adjustable corresponding to a desired processing thickness for the work 3 by a regulating mechanism shown in FIGS. 2 and 7 and described later, similarly to the prior art, in order to process the work 3 as required. Although both grindstones 6 and 7 in the embodiment are adjusted in height, the present invention is applicable also to a case where the height of only the upper grindstone 6 is adjusted.

According to the embodiment, levels of the abrasion of the grindstones 6, 7 are detected by level sensors 31, 32, based on which the upper and lower guides 4 and 5 are manually adjusted by mechanism of an adjusting means 33.

Although the adjusting mechanism 33 is manually driven, since the guides 4 and 5 are in accord with the grindstones 6 and 7 in height owing to the above adjustment, the work 3 is prevented from being separated from the holding hole 2 of the carrier 1 or caught between the carrier 1 and grindstone 6 or 7 due to a step difference between the guides 4, 5 and the grindstones 6, 7 which might result from the abrasion of the grindstones 6 and 7, by preventing such a step difference.

In the adjusting mechanism 33 of the instant embodiment, a slide bearing 34 on the base plate 21 supports a driven guide shaft 35 of the lower guide 5 to be slidable in a vertical direction. A spring 36 urges the driven guide shaft 35 up to the base plate 21. At the same time, a position regulator projection 37a of a micrometer head 37 arranged at the lower end of the driven guide shaft 35 is arranged to abut a lower surface of the base plate 21 so as to minutely adjust the height of the lower guide 5 via the driven guide shaft 35 by a projecting amount of the position regulator projection 37a.

On the other hand, regarding the upper guide 4, a precision linear guide 39 having balls supports a slide arm 38 fixed to the upper guide 4 in a manner so as to be slidable up and down. A position regulator projection 41a of another micrometer head 41 also supports the slide arm 38 from below, so that the height of the upper guide 4 is minutely adjusted by a projecting amount of the regulator projection 41a via the slide arm 38.

The upper and lower guides 4 and 5 are finely and precisely adjusted as above by the regulator projections 37a and 41a based on the detected data of the level sensors 31 and 32. Therefore, the guides 4 and 5 are correctly matched with the grindstones 6 and 7 when a minute level change subsequent to the abrasion occurs, etc.

Alternatively, the position regulating member of the regulating mechanism 33, such as the above-referred micrometer heads or the like, may be coupled to an automatic drive, for instance a motor, which is to be controlled in accordance with the level data detected by the level sensors 31 and 32 to thereby automatically match the upper and lower guides 4 and 5 with the grindstones 6 and 7. The work 3 can alternatively be processed at both surfaces thereof to a predetermined thickness by moving one of the grindstones 6 and 7 to the other, which is within the bounds of the present invention.

Various other arrangements than the level sensors and adjusting mechanism used in the embodiment are naturally permitted for detecting the level of the grindstones 6 and 7 or adjusting the upper and lower guides 4 and 5.

Figure 2:
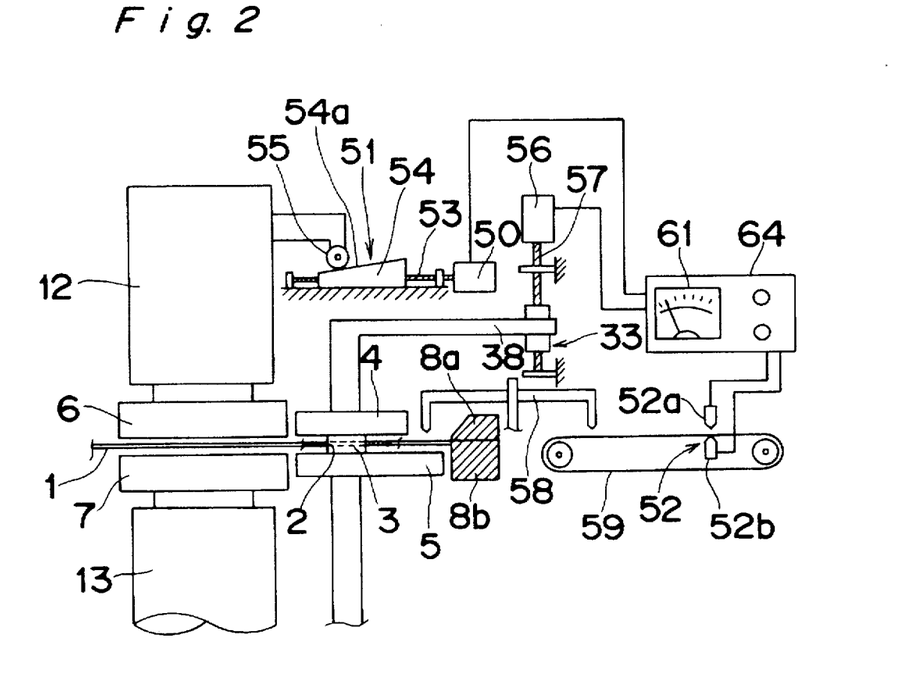
FIG. 2 is a sectional view of part of a duplex head grinding apparatus according to a second embodiment of the present invention.

FIG. 2 is a duplex head grinding apparatus according to a second embodiment of the present invention. The apparatus of the second embodiment is different from the first embodiment in that there are provided a minute cut mechanism 51 only for the upper grindstone 6 of the upper and lower grindstones 6, 7 to move the upper grindstone 6 so as to minutely grind the work 3, a measuring means 52 for measuring a thickness of the processed work 3, and a control means 64 for controlling a processing thickness for the work 3 through the cut mechanism 51 based on the measuring data of the measuring means 52 and a position of the guide 4 corresponding to the grindstone 6 by an amount corresponding to the minute cut of the grindstone 6 via the adjusting mechanism 33.

The description below is related to the above differences alone to avoid repetition of the same explanation.

A slope cam 54 of the minute cut mechanism 51 is meshed with a ball screw 53 driven by a motor 50, and a cam follower 55 on the spindle 12 is supported on an inclined surface 54a of the slope cam 54. When the slope cam 54 is retreated by a minute distance by the ball screw 53 driven suitably by the motor 50, the spindle 12 is moved down by a minute amount while both guide projections 150a (FIG. 7) of a bracket 150 fixed to the spindle 12 are guided by a guide grooves 151a of a guide member 151 to therefore freely cut the upper grindstone 6 minutely. The cam follower 55 is brought into contact with the inclined surface 54a of the slope cam 54 by the weight of the spindle 12. When such a regulation mechanism of the spindle 12 is applied to the spindle 13, the cam follower is preferably pressed against the inclined surface of the slope cam with a pressure provided by a cylinder or motor.

The adjusting mechanism 33 is provided only for the upper guide 4, different from the first embodiment. The slide arm 38 fixed to the upper guide 4 is meshed with a ball screw 57 and lowered by a minute distance by the ball screw 57 when driven by a motor 56, whereby the upper guide 4 is lowered bit by bit by a minute distance corresponding to the cut amount of the upper grindstone 6. The upper guide 4 is accordingly always matched in height with the cut upper grindstone 6.

The processed work 3 is picked up from the carrier 1 by an unloader 58 utilizing a suction nozzle or the like, and moved onto a transfer conveyor 59 to be transferred to a predetermined position. The measuring means 52 referred to earlier is disposed in the middle of the transfer conveyor 59. The measuring means 52 measures a thickness of the processed work 3 from a distance between the processed work 3 and upper and lower sensors 52a and 52b when the processed work 3 on the conveyor 59 passes the sensors 52a, 52b. Needless to say, the thickness may be measured by any other method.

The measuring data of the measuring means 52 is confirmed through a meter 61 of the control means 64 utilizing a microcomputer or the like. The control means 64 controls the motors 50 and 56 based on the measuring data so as to control the minute cutting of the grindstone 6 and the position of the upper guide 4.

The control means 64 activates the minute cut mechanism 51 for the grindstone 6 on the basis of the measuring data related to the thickness of the processed work 3 obtained by the measuring means 52, thereby to adjust the grindstone 6 correspondingly to the abrasion and of the grindstone 6. Accordingly, the work 3 is surely processed to a predetermined thickness at all times. In addition, the control means 64 adjusts also the height of the upper guide 4 corresponding to the adjusted grindstone 6 based on the measuring data, and therefore a step difference is never generated between the grindstone 6 and guide 4 even after the minute cutting of the grindstone 6 for the predetermined thickness. The embodiment ensures that the work 3 is supplied stably and processed highly accurately.

The above idea of adjusting an amount of the minute cutting of the upper grindstone 6 and the position of the upper guide 4 is applicable to the lower grindstone 7 and lower guide 5, and moreover to the upper and lower grindstones 6, 7 and upper and lower guides 4, 5 at the same time.

The aforementioned mechanism in the second embodiment may be added to the first embodiment.

In the foregoing constitution of the first and second embodiments of the present invention, since the plate-like carrier is held in tension by the rigid holders at the outer peripheral part thereof, the carrier is neither vibrated nor becomes slack consequent to the accumulation of extensions and shrinkage at each part, and shows a high rigidity at the outer peripheral part thereof. Therefore, when the work held in the holding hole formed at the outer peripheral part of this carrier is carried and guided by the upper and lower guides between either one of a pair of grindstones, the work is never affected by vibration or slackness of the carrier. Moreover, since the carrier is rotated stably via the holders, the work never falls out of the holding hole to fall into a gap between the grindstone and the guides or outside the holding hole and to be is never caught between the carrier and grindstone during the transfer by the carrier. The work is hence positively and stably transferred and highly accurately processed. Furthermore, since the outer peripheral part of the carrier transferring the work has high rigidity and stability without vibration or slack, the carrier is prevented from being abraded by touching the grindstones. That is, the carrier is improved in durability, thereby assuring highly accurate processing for a long time.

When there is provided the adjusting means to adjust the guides in height to the grindstones, the guides agree with a predetermined position of the corresponding grindstones. Even if the level or height of the grindstone at the predetermined position is changed due to abrasion or the like, no step difference is generated between the grindstone and guide, thus surely preventing the work from dropping out from the holding hole of the carrier and being caught between the carrier and grindstone.

When the apparatus is provided with the minute cut mechanism, measuring means for measuring the thickness of the processed work, and control means for controlling the minute cut mechanism so as to process the work to a required thickness, the grindstone is adjusted corresponding to the abrasion or the like thereof by the control means through the minute cut mechanism based on the data related to the thickness of the processed work measured by the measuring means. In a case where the control means controls the guide by an amount corresponding to the cut amount of the grindstone, a step difference is not generated between the cut grindstone and the guide adjusted correspondingly to the cut grindstone, so that the work is supplied stably and highly accurately processed.

A grinding apparatus according to a third embodiment of the present invention, specifically an apparatus for feeding and taking works to and from a rotary carrier will be depicted with reference to the drawings.

Figure 3:
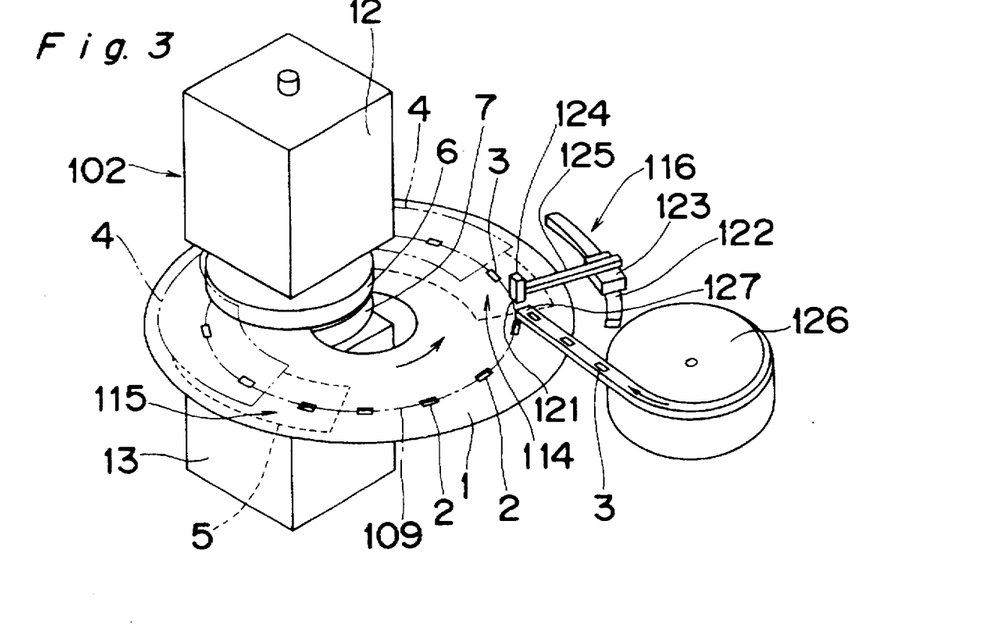
FIG. 3 is a perspective view of the whole constitution of an apparatus for feeding/taking works to/from a rotary carrier in a duplex head grinding apparatus according to a third embodiment of the present invention.
Figure 4:
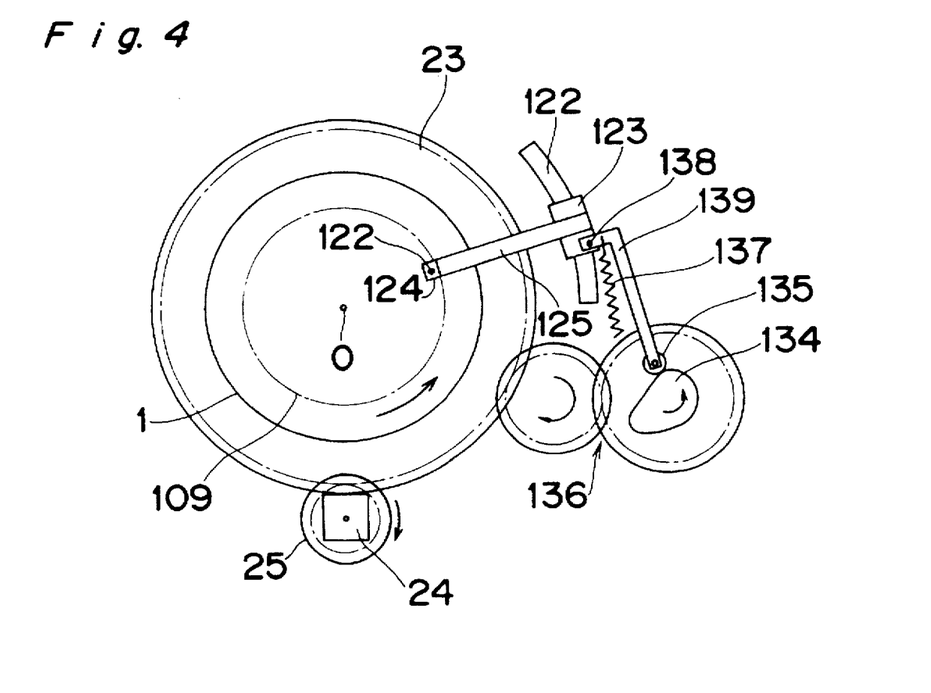
FIG. 4 is a plan view of a driving mechanism for the rotary carrier of the apparatus of FIG. 3 and an interlocking mechanism of the rotary carrier with a suction nozzle.

FIGS. 3 and 4 indicate a work feed-in/out apparatus as the third embodiment of the present invention. As shown in the drawings, similar to the conventional example discussed earlier, the work 3 of a thin film, e.g., a piezoelectric element carried and supplied by the rotary carrier 1, is processed between two upper and lower grindstones 6 and 7 facing each other and driven by driving parts 12 and 13 of a duplex head grinding apparatus 102, and is taken out from the carrier 1 after being processed.

The rotary carrier 1 formed like a thin plate has the holding holes 2 to carry the works 3 therein. Each work 3 held in the holding hole 2 is prevented from falling outside a hole 2 owing to the lower guide 5 below a moving path 109 along which the work 3 is transferred, and is prevented from popping up owing to the upper guide 4 above the moving path 109.

While both surfaces of the thin film work 3 can be processed at one time in the same manner as in the prior art, needless to say, the embodiment is not limited to the double processing, i.e., processing of both surfaces at one time, but is similarly applicable to various kinds of works to be processed in diversified manners, including the processing of one surface. In such cases, the duplex head grinding apparatus 102 is replaced with other necessary machines.

In order to carry out diverse types of processing, a work feed-in position 114 is set immediately before the duplex head grinding apparatus 102 as seen from a rotating direction of the rotary carrier 1 shown in FIG. 3. A work take-out position 115 is set immediately after the duplex head grinding apparatus 102.

A work feed-in mechanism 116 as shown in FIG. 3 is installed at the work feed-in position 114, while a work take-out mechanism (not shown) is disposed at the take-out position 115. The work take-out mechanism is the same mechanism as the work feed-in mechanism 116, but is used reversely and, the description of it is therefore abbreviated.

The work feed-in mechanism 116, as well as the work take-out mechanism (not shown), is equipped with a reciprocatory suction nozzle 121, by way of example of a holding means which moves to supply or take out the work 3 to or from the rotary carrier 1 in synchronization with the rotary carrier 1. An arc guide 122 guides the reciprocating suction nozzle 121 along a locus of a circular arc that has a center that is a rotary center O of the rotary carrier 1.

Figure 8:
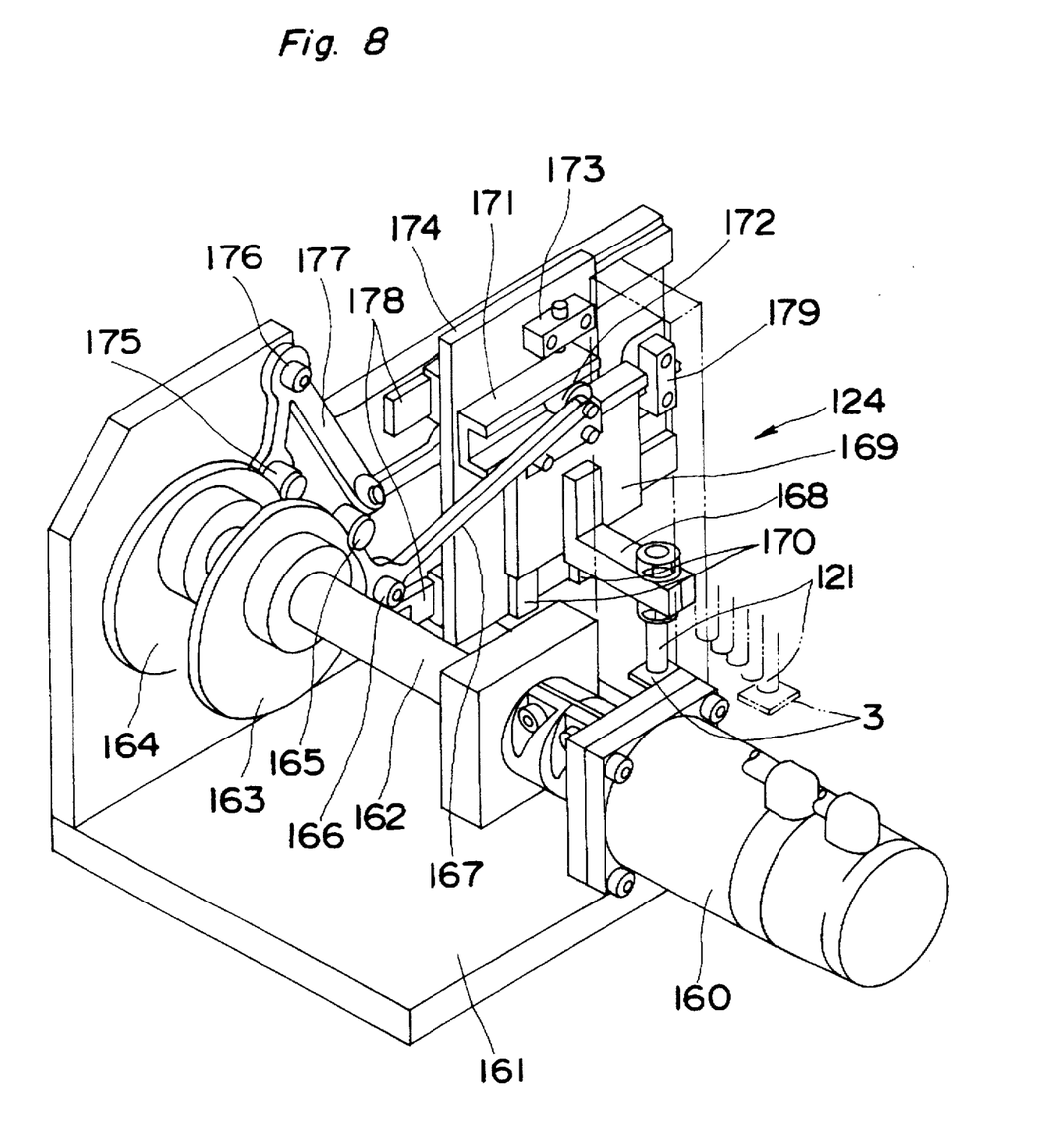
FIG. 8 is a perspective view showing a driving mechanism for driving a reciprocating suction nozzle of FIG. 3.

A reciprocation mechanism of the reciprocating suction nozzle 121 is shown in FIG. 8. In FIG. 8, a motor 160 fixed to a casing 161 rotates a rotary shaft 162 rotatably supported by the casing 161. A first cam 163 and a second cam 164 are fixed to the rotary shaft 162. A first cam follower 165 arranged at one end of an L-shaped link member 167 is always brought into contact with a side surface of the first cam 163 to move in accordance with the configuration of the first cam 163. The L-shaped link member 167 turns around a turning shaft 166 in both clockwise and counterclockwise directions in accordance with the movement of the first cam follower 165, so that a rotary follower 172 arranged at the other end of the L-shaped link member 167 moves upward and downward. The rotary follower 172 is fitted into a C-shaped member 171 fixed to an upper end of a vertical movement plate 169. The vertical movement of the vertical movement plate 169 is guided by two parallel guide members 170 fixed to a horizontal movement plate 174. The upper limitation of the vertical movement plate 169 is restricted by contacting the C-shaped member 171 with a stopper 173. The horizontal movement of the horizontal movement plate 174 is guided by two parallel guide members 178 fixed to the casing 161. A second cam follower 175 arranged at one end of an L-shaped link member 177 is always brought into contact with a side surface of the second cam 164 to move in accordance with the configuration of the second cam 164. The L-shaped link member 177 turns around a turning shaft 176 in both clockwise and counterclockwise directions in accordance with the movement of the second cam follower 175, so that the horizontal movement plate 174 connected to the other end of the L-shaped link member 177 moves left and right in FIG. 8 while being guided by the guide members 178. The leftward movement of the horizontal movement plate 174 is restricted by contacting the horizontal movement plate 174 with a stopper 179.

The reciprocating suction nozzle 121 is fixed to an L-shaped member 168 fixed to the vertical movement plate 169. Therefore, the motor 160 is driven and the first and second cams 163 and 164 are rotated to vertically move the horizontal movement plate 169 in accordance with the configuration of the first cam 163 and horizontally move the horizontal movement plate 174 in accordance with the configuration of the second cam 164. Thus, the reciprocating suction nozzle 121 is vertically and horizontally moved in a reciprocal manner in accordance with the movements between the first cam 163 and the follower 165 and the second cam 164 and the cam follower 175.

The rotary carrier 1 transfers the work 3 as it rotates, the works 3 being subjected to various kinds of work during the transfer. Meanwhile, the suction nozzle 121 promptly sucks even any small, thin work 3 and quickly frees the work 3 by stopping the suction. The work 3 suctioned by the suction nozzle 121 at a predetermined position 127, for instance, in the vicinity of the feed-in position 114 in FIG. 3 is transferred while maintaining a confronting position with the holding hole 2 at a predetermined position of the rotary carrier 1 in the early stage of the first half of the reciprocation of the suction nozzle 121, which is synchronized with the rotation of the rotary carrier 1. When the suction nozzle 121 stops suctioning the work 3 in the middle of the transfer, the work 3 is released and correctly supplied onto the holding hole 2 of the rotary carrier 1 in a state equivalent to when the work 3 and the rotary carrier 1 are at a relative velocity, that is, both are in pause, where the work 3 is processed. When the work 3 is to be picked up, the suction nozzle 121 is transferred while maintained confronting the holding hole 2 at a predetermined position of the rotary carrier 1 in the early stage of the first half of the reciprocation of the suction nozzle 121 synchronized with the rotation of the rotary carrier 1. The suction nozzle 121 suctions the processed work 3 held in the holding hole 2 of the rotary carrier 1 in the middle of the transfer, so that the processed work 3 is stably picked up in the same state as when the relative speed to the rotary carrier 1 is zero. The suction of the picked-up work 3 may be continued further to a predetermined position in the vicinity of the take-out position 115 before the work 3 is released at the predetermined position and discharged outside from the predetermined position. Even the small and thin work 3 is positively sucked and held by the suction nozzle 121 and released at a suitable occasion without fail. After returning to the original position, the suction nozzle 121 repeats the above process with a predetermined cycle. In consequence, the work 3 is automatically supplied or picked up continuously while the rotary carrier 1 is kept rotating, therefore saving labor. Moreover, since the work 3 is subjected, at a stable speed and in a stable state, to various kinds of processing owing to the continuous rotation of the rotary carrier 1, highly accurate and highly efficient processing is achieved. The reciprocatory movement of the suction nozzle 121 is guided by the arc guide 122 along the locus of a circular arc which is centered on the rotary center O of the rotary carrier 1. Therefore, the moving locus of the suction nozzle 121 corresponds properly to the locus 109 shown when the holding hole 2 at a predetermined position of the rotary carrier 1 facing the suction nozzle 121 moves, so that the work 3 is surely supplied and picked up to the rotating carrier 1 without a positional shift of the loci.

The arc guide 122 is coaxially fixed at the periphery of the rotary carrier 1, as is clear from FIGS. 3 and 4, and guides a slider 123, via ball bearings arranged between them, along the circular arc locus about the rotary center O of the rotary carrier 1. The slider 123 is coupled via a supporting arm 125 with a suction head 124 rotating or moving the suction nozzle 121 up and down. When the suction nozzle 121 is reciprocated together with the suction head 124 in the circular arc locus in conformity with the moving locus 109 of the holding hole 2, the slider 123 rotates or moves the suction nozzle 121 up and down upon necessities irrespective of the state of the nozzle 121, that is, whether the nozzle 121 is stopped or moved.

As shown in FIG. 3, the work 3 is transferred by parts feed mechanism 126 utilizing, for example, a vibration-type parts feeder or the like feeding the work 3 to the predetermined position 127 immediately above the moving path 109.

In the meantime, the work feed-in mechanism 116 operates as follows. The work 3 is suctioned at the predetermined position 127 by the suction nozzle 121 moving downward in the early stage of the first half of the reciprocation of the suction nozzle 121. Thereafter, the work feed-in mechanism 116 picks up the work 3 sucked by the suction nozzle 121 when the suction nozzle 121 moves up. While so holding and transferring work 3 in the synchronous movement of the suction nozzle 121 with the rotation of the rotary carrier 1 so as to be opposed to the predetermined holding hole 2 of the rotary carrier 1, the feed-in mechanism 116 fits the work 3 into the holding hole 2 when the suction nozzle 21 moves down during the transfer, and leaves the work 3 in the holding hole 2 as the suction nozzle 121 stops sucking and moves upward, to thereby to complete the supply of the work 3 to the rotary carrier 1.

On the other hand, in the work take-out mechanism, after the work 3 is transferred by the rotary carrier 1 and has been processed through various kinds of processes the suction nozzle 121 maintained opposed to the processed work 3 in the predetermined holding hole 2 descends to suck and take the work 3 from the carrier 1, due to the first half of the reciprocation of the suction nozzle 121 synchronously with the rotary carrier 1. The work take-out mechanism picks up and takes out the work 3 from the holding hole 2 as the suction nozzle 121 ascends. When the work take-out mechanism carries the work 3 to the predetermined take-out position, the suction nozzle 121 descends and then stops suctioning or stops suctioning without descending, so that the work 3 is discharged to a predetermined position for disposal or suitable treatment.

Since the suction nozzle 121 is rotated mainly during the time while the work feed-in mechanism 116 transfers the work 3, the rotating direction of the work 3 suctioned by the suction nozzle 121 is corrected so as to not to shift from the holding hole 2 to thereby prevent failure in the supply of the work 3 to the rotary carrier 1. For this purpose, a known photographing device or detecting mechanism and a controlling mechanism are necessitated to detect the direction of the work 3 supplied by the suction nozzle 121.

However, the above up-and-down mechanism or rotary mechanism is not essential, and the suction nozzle 121 may be an extensible nozzle, for instance, such as a bellows.

In the embodiment as indicated in FIG. 4, when a driving gear 25 directly coupled with the motor 24 is meshed with a gear 23 of a large diameter rotating in association with the rotary carrier 1, the rotary carrier 1 is driven by the motor 24 with a given reduction gear ratio.

A cam follower 135 driven by a cam 134 is provided at one end of an arm 139 having the other end coupled to the slider 123 via a pin 138, and at the same time, the cam 134 is coupled to the gear 23 via gears 136. In consequence, the slider 123 is reciprocated, via the cam follower 135 and arm 139, by the cam 134 interlocking with the rotary carrier 1, whereby the suction nozzle 121 is moved in association with the rotation of the rotary carrier 1 and quickly returned in accordance with a contour of the cam 134 when reaching a terminal end of a predetermined stroke. A spring 137 urges the arm 139 towards the cam 134 so as to let the arm 139 engage the cam 134 via the cam follower 135.

In the arrangement as above, the positional relationship and speed relationship of the first half reciprocation of the suction nozzle 121 in synchronous movement with the rotary carrier 1 are fixedly determined by the shape and speed ratio of the cam 134. Accordingly, the position and speed of the suction nozzle 121 in the moving direction of the holding hole 2 at the predetermined position of the rotary carrier 1 are maintained properly. The work 3 is surely supplied to or taken out from the holding hole 2 of the rotating rotary carrier 1 without failure, i.e., without any shift in the positional relationship in the moving direction or in the moving speed.

As one actual example, when the carrier 1 has 20 holding holes 2, the suction nozzle 121 reciprocates between each holding hole and the work feed-in position or take-out position through each of 20 rotations of the first and second cams 163 and 164.

Various other types of mechanisms and control circuits than the above may be employable for the reciprocation of the suction nozzle 121 interlocking with the rotation of the rotary carrier 1.

For example, a driving source for the suction nozzle 121, particularly, a driving source for driving the suction nozzle 121 in the first half of the reciprocatory movement may be accomplished by a pneumatic, hydraulic or transmission mechanism interlocking with the rotation of the rotary carrier 1. Such a mechanism that transmits the rotation of the rotary carrier 1 to member(s) on the side of the suction nozzle 21, e.g., the slider 123, etc. with a necessary period of timing and only for a necessary time may be used.

According to the work feed-in/take-out apparatus of the invention featured as above, the rotary carrier transfers the supplied work as the rotary carrier itself rotates and offers various kinds of treatments during the transfer. In the meantime, the suction nozzle, which is capable of promptly suction any small thin work and promptly releasing the work, holds and carries the work suctioning at a predetermined position in the early stage of first half of the reciprocatory movement in synchronization with the rotation of the rotary carrier 1, in a state confronting a predetermined position of the rotary carrier. The suction nozzle frees the work in the middle of the transfer to correctly feed the work onto the predetermined position of the rotating rotary carrier in a state equivalent to when the relative speed is zero, so that the work is processed through the rotation of the rotary carrier. Moreover, the suction nozzle, in the first half of the reciprocatory movement in synchronization with the rotation of the rotary carrier 1, and in a state confronting a predetermined position of the rotary carrier, stably suction and picks up the finished work held at the predetermined position on the rotary carrier in a state equivalent to when the relative speed is zero, and discharges the work at a predetermined position after transferring to the predetermined position. Therefore, even a small and thin work is positively suctioned, transferred, and released without fail at a suitable occasion by the suction nozzle. Since the sequence of operations of the suction nozzle is repeated with a predetermined cycle, the work is supplied or taken out automatically while the rotary carrier 1 is rotated, thus saving labor. At the same time, since the work is supplied at a stable speed in a stable state because of the continuous rotation of the rotary carrier, the work is processed with high accuracy and high efficiency. In addition, the reciprocation of the suction nozzle is guided by the arc guide to trace the circular arc locus, and consequently the moving locus of the suction nozzle properly corresponds to the moving locus of the holding hole at a predetermined position of the confronting rotary carrier, so that the work is supplied or picked up to or from the rotating carrier correctly without a positional shift of the loci.

In the structure equipped with the interlocking mechanism for reciprocating the suction nozzle with a predetermined cycle in synchronization with the rotation of the rotary carrier, the positional relationship and speed relationship between the suction nozzle and rotary carrier are fixed. The position and speed in the moving direction of the suction nozzle to a predetermined position of the rotary carrier are thereby maintained properly. Accordingly, the work is supplied or taken out to or from the rotating carrier with no shift in the positional and speed relationships in the moving direction.

Although the present invention has been fully described in connection with preferred embodiments thereof and with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A grinding apparatus comprising:
    a rotatably mounted disc-shaped carrier having a plurality of holding holes therein in a circumferential direction thereof for holding work in said holding holes and transferring the work by rotational movement thereof, said carrier having an outer peripheral part and a rotary center;
    an annular holder member holding said carrier at said outer peripheral part such that said carrier is in tension;
    upper and lower guide members located on respective upper and lower sides of said carrier along the circumferential direction of said carrier;
    a grindstone disposed at a processing position on one of the upper and lower sides of said carrier for grinding a surface of the work; and
    a driving device connected with said holder member holding said outer peripheral part of said carrier to rotate said holder member around said rotary center so as to drive said outer peripheral part of said carrier in a stable manner without vibrations or slack of said carrier such that said carrier is prevented from being abraded by contact with said grindstone.

2. The grinding apparatus of claim 1, wherein said grindstone is a first grindstone and a second grindstone is disposed at said processing position on the other of the upper and lower sides of said carrier facing said first grindstone, whereby the work can have upper and lower surfaces thereof ground at the same time by said first and second grindstones.

3. The grinding apparatus of claim 1, and further comprising an adjusting device connected with the one of said upper and lower guide members that is on the same side of said carrier as said grindstone for adjusting a position of the one of said upper and lower guide members such that the one of said upper and lower guide members has a surface spaced from said carrier a distance corresponding to the spacing of said grindstone from said carrier.

4. The grinding apparatus of claim 2, and further comprising adjusting devices connected with said upper and lower guide members for adjusting positions of said upper and lower guide members such that surfaces thereof are spaced from said carrier distances corresponding to the spacing of said grindstones from said carrier.

5. The grinding apparatus of claim 2, and further comprising an adjusting device connected with said upper and lower guide members for adjusting positions of said upper and lower guide members such that said upper and lower guide members have surfaces thereof spaced from said carrier distances corresponding to the spacing from said carrier of respective ones of said first and second grindstones on corresponding sides of said carrier.

6. The grinding apparatus of claim 1, and further comprising:
    a mechanism for moving said grindstone;
    a measuring device for measuring the thickness of the work after having been ground by said grindstone;
    a control device controlling said mechanism in response to measurements made by said measuring device.

7. The grinding apparatus of claim 2, and further comprising:
    a mechanism for moving said grindstone;
    a measuring device for measuring the thickness of the work after having been ground by said grindstone;
    a control device controlling said mechanism in response to measurements made by said measuring device.

8. The grinding apparatus of claim 6, wherein said control device adjusts the position of the one of said upper and lower guide members on the same side of said carrier as said grindstone an amount equal to the amount of grinding by said grindstone.

9. The grinding apparatus of claim 7, wherein said control device adjusts the position of said upper and lower guide members an amount equal to the amount of grinding by said first and second grindstones.

10. The grinding apparatus of claim 1, and further comprising:
    a holding device for holding and moving the work between one of said holding holes of said carrier and at least one of a feed-in position and a take-out position;
    an arc guide member guiding said holding device between the one of said holding holes and at least one of the feed-in position and the take-out position along a circular arc centered on said rotary center; and
    an interlocking mechanism for moving said holding device while said holding device is guided by said arc guide member in synchronization with rotation of said carrier.

11. The grinding apparatus of claim 10, wherein said holding device comprise a suction nozzle for suctioning the work.

12. The grinding apparatus of claim 1, wherein said annular holder member comprises annular rigid holders clamping said carrier therebetween.

13. The grinding apparatus of claim 12, wherein said annular holder further comprises a ring held by one of said annular rigid holders and an annular recess in the other of said annular rigid holders, said ring engaging said outer peripheral part of said carrier and being pressed together with said carrier into said annular recess.

14. A grinding method comprising:

fitting works one by one in to a plurality of holes that are located along a circumferential direction of a disc-shaped carrier that is held in tension by an annular holder member at an outer peripheral part of the carrier;

rotating the holder member about a rotary center of the carrier by driving the outer peripheral part of the carrier in a stable manner without vibrations or slack of the carrier such that the carrier is prevented from being abraded by contact with a grindstone, while guiding upper and lower surfaces of each work that is fitted in the holding holes of the carrier with upper and lower guide members as the works are moved by the carrier; and grinding one of the upper and lower surfaces of the works with the grindstone disposed at a corresponding one of the upper and lower sides of the carrier.

15. The method of claim 14, wherein while the one of the upper and lower surfaces of the works are ground with the grindstone, the other of the upper and lower surfaces of the works is guided by a corresponding one of the upper and lower guide members.

16. The method of claim 14, wherein the grindstone is a first grindstone and the other of the upper and lower surfaces of the works are ground with a second grindstone, disposed at a corresponding side of the carrier and confronting the first grindstone, simultaneously with the grinding of the one of the upper and lower surfaces of by the first grindstone.

17. The method of claim 14, and further comprising adjusting the position of the surface of the one of the upper and lower guide members that is on the same side of the carrier as the grindstone in correspondence with the position of the surface of the grindstone.

18. The method of claim 16, and further comprising adjusting the position of the surface of the one of the upper and lower guide members that is on the same side of the carrier as the grindstone in correspondence with the position of the surface of the grindstone.

19. The method of claim 14, and further comprising:

moving the grindstone during grinding;

measuring the thickness of the works after grinding; and controlling the amount of grinding by the grindstone by controlling said moving of the grindstone in response to said measuring of the thickness of the works.

20. The method of claim 16, and further comprising:

moving at least one of the grindstones during grinding;

measuring the thickness of the works after grinding; and controlling the amount of grinding by the grindstone by controlling said moving of the at least one of the grindstones in response to said measuring of the thickness of the works.

21. The method of claim 19, wherein one of the upper and lower guide members on the same side of the carrier as said grindstone is positionally adjusted during said controlling by the amount of grinding by the grindstone during said grinding.

22. The method of claim 20, wherein at least one of the upper and lower guide members is positionally adjusted during said controlling by an amount corresponding to the amount of grinding by the grindstones during said grinding.

23. The method of claim 14, and further comprising:

holding and moving the works with a holding device between holding holes of the carrier and at least one of a feed-in position and a take-out position; and guiding movement of the holding device with an arc guide member between the holding holes of the carrier and the at least one of a feed-in position and a take-out position along a circular arc centered on the rotary center of the carrier in synchronization with the rotation of the carrier.

24. The grinding method of claim 22, wherein the works are held by the holding device with suction.

* * * * *